(12) United States Patent
Rossman et al.

(10) Patent No.: US 8,260,201 B2
(45) Date of Patent: *Sep. 4, 2012

(54) DISPERSIVE ANTENNA FOR RFID TAGS

(75) Inventors: Court Rossman, Merrimack, NH (US); John T. Apostolos, Lyndeborough, NH (US); Karl D. Brommer, Exeter, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 815 days.

This patent is subject to a terminal disclaimer.

(21) Appl. No.: 12/271,292

(22) Filed: Nov. 14, 2008

(65) Prior Publication Data

US 2009/0284351 A1 Nov. 19, 2009

Related U.S. Application Data

(63) Continuation-in-part of application No. 11/578,275, filed on Jul. 30, 2007, now Pat. No. 8,010,048.

(51) Int. Cl.
*H04B 5/00* (2006.01)
*H04Q 5/22* (2006.01)

(52) U.S. Cl. ... 455/41.1; 455/41.2; 455/572; 455/343.1; 340/10.34

(58) Field of Classification Search ........ 455/41.1, 455/41.2, 41.3, 42, 572, 573, 106, 343.1, 455/336; 340/10.1, 10.4, 10.34, 13.26, 572.1, 340/572.4, 572.7; 343/895

See application file for complete search history.

(56) References Cited

U.S. PATENT DOCUMENTS

| | | | |
|---|---|---|---|
| 3,782,730 A | 1/1974 | Horchler | |
| 4,165,653 A * | 8/1979 | Morehouse | 73/722 |
| 4,792,887 A * | 12/1988 | Bernitz et al. | 363/89 |
| 5,191,351 A * | 3/1993 | Hofer et al. | 343/895 |
| 5,273,939 A | 12/1993 | Becker et al. | |
| 5,612,860 A * | 3/1997 | Meszlenyi | 363/49 |
| 6,259,372 B1 | 7/2001 | Taranowski et al. | |
| 6,577,238 B1 * | 6/2003 | Whitesmith et al. | 340/572.1 |
| 6,614,853 B1 * | 9/2003 | Koslar et al. | 375/271 |
| 6,946,989 B2 | 9/2005 | Vavik et al. | |

(Continued)

FOREIGN PATENT DOCUMENTS

WO 2007025024 3/2007

(Continued)

OTHER PUBLICATIONS

"Was That Really a Wildlife Tag?", an excerpt from Homing In, 73 Magazine, Jan. 2003. Printed from http://www.homingin.com/joemoell/squeff.html on Aug. 12, 2008.

(Continued)

*Primary Examiner* — Duc M Nguyen
(74) *Attorney, Agent, or Firm* — Finch & Maloney PLLC; Neil F. Maloney (57) ABSTRACT

RFID tag designs and sensors are disclosed that include a dispersive antenna and exhibit greater detection ranges relative to conventional designs. The designs include, for example a transponder having including a rectifier, a radio-frequency identification (RFID) circuit for receiving and responding to interrogation signals, and a frequency dispersion element for receiving a multi-phase input signal and creating a pulse therefrom for input to the rectifier. Frequency-dispersive elements (e.g., antennas) and compatible interrogation waveforms can be used so that the rectifying diodes receive high peak voltage levels relative to the average voltage levels.

20 Claims, 9 Drawing Sheets

U.S. PATENT DOCUMENTS

| | | | |
|---|---|---|---|
| 7,228,156 | B2 | 6/2007 | Gilbert |
| 7,385,511 | B2 * | 6/2008 | Muchkaev ................ 340/572.4 |
| 7,791,249 | B2 * | 9/2010 | Hines et al. ............... 310/313 B |
| 7,924,160 | B1 * | 4/2011 | LaPenta et al. ............ 340/572.4 |
| 7,970,357 | B2 * | 6/2011 | Gili et al. ........................ 455/83 |
| 2001/0033251 | A1 * | 10/2001 | Rudish .......................... 343/895 |
| 2003/0234730 | A1 | 12/2003 | Arms et al. |
| 2004/0022299 | A1 * | 2/2004 | Anglin, Jr. ..................... 375/139 |
| 2005/0052287 | A1 * | 3/2005 | Whitesmith et al. ..... 340/825.72 |
| 2005/0192727 | A1 * | 9/2005 | Shostak et al. .................. 701/37 |
| 2005/0226312 | A1 * | 10/2005 | Koslar et al. .................. 375/142 |
| 2007/0046369 | A1 * | 3/2007 | Schober et al. ................... 330/7 |
| 2007/0085689 | A1 | 4/2007 | Brommer et al. |
| 2007/0107766 | A1 * | 5/2007 | Langley et al. ............... 136/243 |
| 2007/0188967 | A1 * | 8/2007 | Smith et al. ................... 361/155 |
| 2007/0281657 | A1 | 12/2007 | Brommer et al. |
| 2008/0119716 | A1 * | 5/2008 | Boric-Lubecke et al. .... 600/407 |
| 2008/0252422 | A1 * | 10/2008 | Dowla et al. ................. 340/10.1 |

FOREIGN PATENT DOCUMENTS

| | | |
|---|---|---|
| WO | 2007025025 | 3/2007 |
| WO | 2007025060 | 3/2007 |
| WO | 2007025061 | 3/2007 |

OTHER PUBLICATIONS

Kurokawa, "Injection Locking of Microwave Solid-State Oscillators", Proceedings of the IEEE, vol. 16, No. 10, Oct. 1973 (28 pages).

Lindsey et al., "Mutual Synchronization Properties of a System of Two Oscillators with Sinusoidal Phase Detectors", IEEE Transactions on Communications, Dec. 1976 (6 pages).

Van Der Pol, "The Nonlinear Theory of Electric Oscillations", Proceedings of the Institute of Radio Engineers, vol. 11, No. 9, Sep. 1934 (26 pages).

Blaquere, "Nonlinear Oscillators and the Nyguist Diagram", J. Phys. Radium 13, 527-540 (1952) (15 pages) (English abstract provided).

Schlosser, "Noise is Mutually Synchronized Oscillators", IEEE Transations on Microwave Theory and Technigues, vol. MIT-16, No. 9, Sep. 1968 (6 pages).

Gersho et al., Mutual Synchronization of Geographically Separated Oscillators, Bell Syst. Tech. J., vol. 45, Dec. 1966 (17 pages).

International Search Report from related PCT Application PCT/US06/01890, Aug. 24, 2006 (1 page).

* cited by examiner

DISPERSIVE ANTENNA FOR RFID TAGS

RELATED APPLICATIONS

This application is a continuation-in-part to 11/578,275, now U.S. Pat. No. 8,010,048, filed Jul. 30, 2007, and titled "Microradio Design, Manufacturing Method, and Applications for Use of Microradios". In addition, this application is related to U.S. Pat. No. 7,970,357, filed Nov. 14, 2008, and titled "Transponder with Stabilized Oscillator". Each of these applications is herein incorporated by reference in its entirety.

FIELD OF THE INVENTION

The invention relates to transponders, and more particularly, to transponders designed to operate in a coherent manner.

BACKGROUND OF THE INVENTION

Radio-frequency identification (RFID) is an identification technique that involves the use of devices known as RFID tags. An RFID tag is a transponder that can be attached to or otherwise integrated into an item to be tracked. The item may be, for example, a product or pallet of products such as those stored in a distributor's warehouse, or individual products on the shelves of a retailer. The item may also be a person or animal, or simply any item exhibiting a particular state. In any such cases, the RF tag can be used in conjunction with a tag reader to uniquely identify the item, or to specify a condition or state of the item using radio waves. In general, a tag reader emits an interrogation signal, which is received and responded to by the RFID tag, thereby resulting in identification of the tagged item. Other information may also be stored in the RFID tag, such as location, number of items remaining in stock, and condition or state of item (e.g., open or closed state).

There are two main classes of RFID tags: passive and active. A passive RFID tag derives its energy for operation from the RF field emitted by the tag reader, and responds to the reader by modulating the reflectivity of its antenna, thereby returning varying amounts of the incident RF energy. An active or semi-active RFID tag responds to the tag reader using RF energy derived from a battery or other local power source on the tag. An antenna included in the RFID tag radiates energy in the radio frequency spectrum to and from the RFID tag. A benefit of passive configurations over active configurations is that no internal power source is required, so as to allow for lower cost and a smaller tag form factor.

However, there are problems associated with passive configurations. For instance, batteryless RFID tags powered by scavenged RF power exhibit a relatively low power output and low sensitivity, and therefore are ineffective over longer ranges. As such, passive RFID tags are typically limited to applications having a short operation range (e.g., less than a few feet), such as those RFID tags used at point of sale for anti-shoplifting and inventory control. In a more general sense, even RFID tags configured with on-board power sources are range limited to some extent.

What is needed, therefore, are RFID tag designs that exhibit greater range of operation, for both active and passive configurations.

SUMMARY OF THE INVENTION

One embodiment of the present invention provides a transponder. The transponder includes a rectifier, a radio-frequency identification (RFID) circuit for receiving and responding to interrogation signals, and a frequency dispersion element for receiving a multi-phase input signal and creating a pulse therefrom for input to the rectifier. The transponder may further include a hysteretic switch coupled between the rectifier and the RFID circuit (or other suitable mechanism to operatively couple the rectifier to the RFID circuit). The frequency dispersion element may comprise, for example, at least one of an antenna, a surface acoustic wave (SAW) correlator, and a dispersive delay line. For instance, in some cases, the frequency dispersion element comprises a spiral antenna. In some such configurations, the spiral antenna comprises an Archimedean spiral antenna, or a log spiral antenna. In other cases, the frequency dispersion element comprises a spiral antenna with one or more resonant parasitic elements. In other cases, the frequency dispersion element comprises a spiral antenna with an offset dielectric substrate to enhance dispersion. In other cases, the frequency dispersion element comprises a surface acoustic wave (SAW) correlator. In one such configuration, the SAW correlator is operatively coupled to an antenna. Alternatively, the SAW correlator can be integrated into an antenna. In other cases, the frequency dispersion element comprises a dispersive delay line. In one such configuration, the dispersive delay line is a meanderline antenna. The dispersive delay line can be, for example, operatively coupled to an antenna, or integrated into an antenna. In some example embodiments, the rectifier operates to convert RF energy of the pulse to DC voltage, multiply that DC voltage, and store the resulting voltage. The RFID circuit may include, for example, an oscillator (although other RFID circuits can be used).

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

RFID tag designs and sensors are disclosed that include a dispersive antenna and exhibit greater detection ranges relative to conventional designs. The designs can be used to benefit both active and passive RFID tag configurations.

General Overview

A passive RFID tag design configured in accordance with an embodiment of the present invention includes a frequency-dispersive antenna operatively coupled to a rectification circuit (sometimes collectively referred to as a rectenna), a hysteretic switch, and an RFID circuit. The rectification circuit operates to convert RF energy collected by the dispersive antenna to DC voltage, multiply that voltage, and store the resulting voltage (in a storage capacitor, which effectively acts as a battery for passive tags). The rectification circuit is configured with component values (including one or more stages of rectification diodes and filter/storage capacitors) selected depending on the frequency band of interest and the amount of RF energy to be stored. The hysteretic switch operates to switch the storage capacitor of the rectification circuit to the RFID circuit when the voltage across that capacitor is above a predetermined level, and to maintain the connection of that capacitor to the RFID circuit until such time as the charging on the capacitor drops below a predetermined level. In this way, hysteretic switch allows conduction of electrical current when a first "charged" threshold voltage is reached (which triggers operation of the RFID circuit), and continues to allow conduction of electrical current until a second lower "recharge" threshold voltage is reached, at which time conduction ceases (and the RFID circuit stops operating). The charging cycle of the capacitor is generally longer relative to the transmit cycle of the RFID circuit. The RFID circuit can be implemented with any number of available configurations such as those capable of modulated backscattering by switched load or active transmission (e.g., via an oscillator circuit).

In general, diode voltage multipliers (such as those included in the rectification circuit) are very sensitive to incident power level to achieve, for example, 1 volt of DC rectification and voltage multiplication. Specifically, the rectified voltage is proportional to the incident RF power, for lower RF power levels. Note, however, that FCC requirements for RFID systems limit the maximum transmit power and bandwidth of the charge/interrogation signal. Thus, the range to charge passive RFID tags is limited. As such, and in accordance with an embodiment of the present invention, it is better to get higher instantaneous power on the voltage multiplier of the rectification circuit, while constrained to the same average power. To achieve this goal, the interrogation waveform is chirped (repetitively swept across frequency) and in free space is the continuous wave (CW) instantaneous power. At the voltage multiplier of the rectification circuit of the RFID tag, after the frequency-dispersive antenna, the chirped interrogation waveform manifests as a higher power pulse. The chirped interrogation waveform can also be referred to as a multi-phase input signal.

By using a frequency-dispersive antenna, interrogation waveforms may be selected where input voltages to the diode rectifiers vary with time. While the same average power is transmitted, choosing interrogation waveforms so that dispersive antenna delays cause pulse-like burst inputs to the rectifier circuit exploit the exponential increase in diode efficiency with increased input voltage. For a given average power level, it is advantageous to have high peak voltage intervals. Thus, frequency-dispersive antennas and compatible interrogation waveforms can be used so that the rectifying diodes receive high peak voltage levels relative to the average voltage levels, thereby improving rectification efficiency.

RFID Tag

Figure 1A:
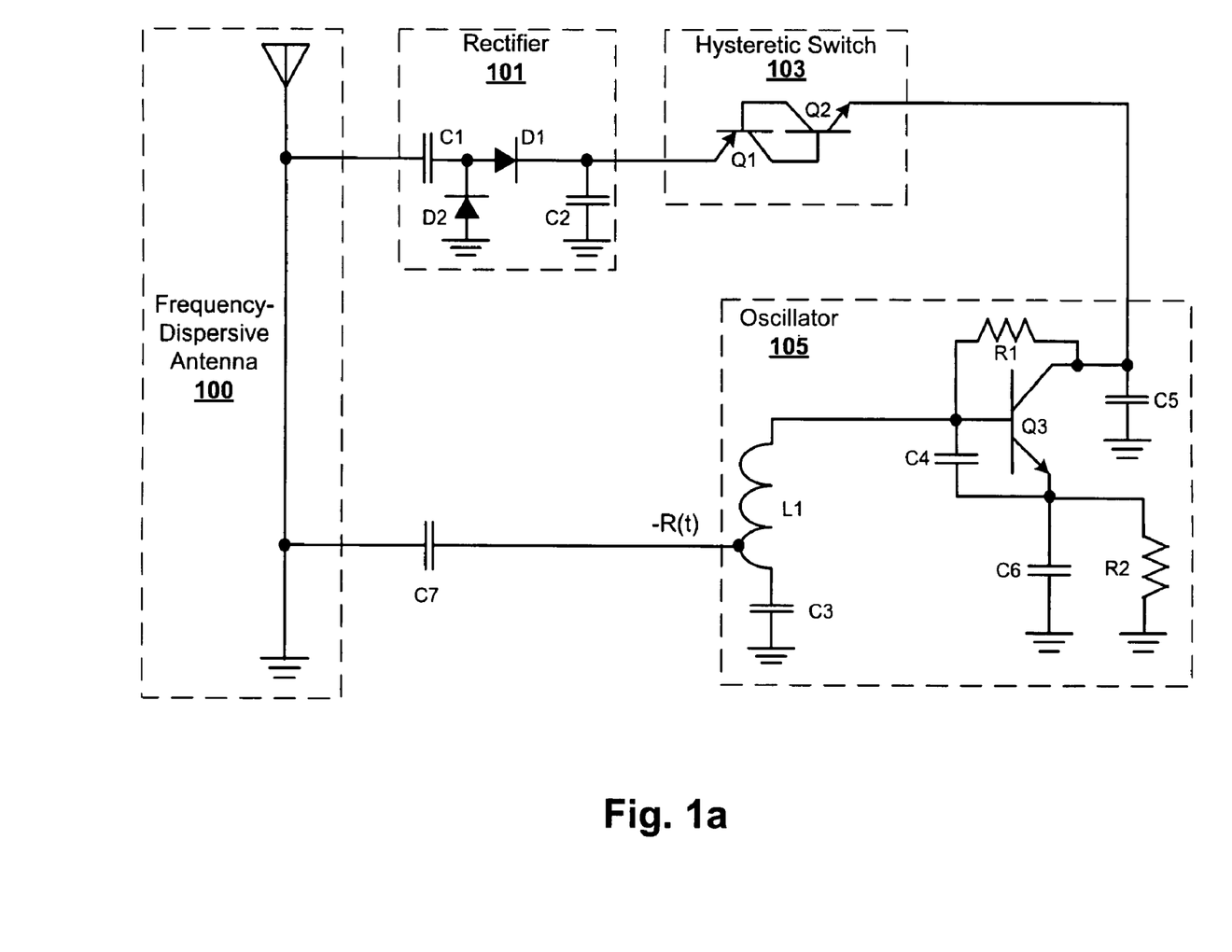
FIG. 1a is a schematic of an example RFID tag circuit configured with a frequency-dispersive antenna, in accordance with an embodiment of the present invention.

FIG. 1a is a schematic of a coherent RFID tag configured in accordance with an embodiment of the present invention. As can be seen, the coherent RFID tag is configured with four main blocks, including a frequency-dispersive antenna 100, a rectifier 101, a hysteretic switch 103, and an RFID circuit configured as a stabilized oscillator 105. As will be appreciated, the frequency-dispersive antenna 100 and rectifier 101 may be implemented in a single block referred to as a rectenna. The tag operates in conjunction with a tag reader that includes a transmitter capable of generating a chirped waveform for interrogating the RFID tag. The frequency range and power level of the chirped interrogation signal will depend on the particular application. In one example embodiment, for instance, the ultra-wide band (UWB) can be used for the chirp interrogation signal (e.g., 3.0 GHz to 10.6 GHz, with a power spectral density emission limit of about −41.3 dBm/MHz). Other input frequencies may be even higher (e.g., up to 100 GHz). The interrogator charging signal can be provided by any number of suitable sources.

The rectenna is configured with a frequency-dispersive antenna 100 operatively coupled to a rectification circuit 101 including capacitors C1 and C2 and diodes D1 and D2. The rectifier 101 provides DC power to the RFID tag circuitry by rectification and storage of RF energy collected by the antenna 100. The frequency-dispersive antenna 100 can be configured, for example, as a spiral, saw-based, integrated dispersive delay line, or other suitable frequency-dispersive antennas, and will depend on the frequency band of interest. Example antenna 100 designs (or frequency dispersion elements) will be discussed with reference to FIGS. 2a-5.

With respect to the example rectifier circuit 101, the values of capacitors C1 and C2 will depend on the frequency band of interest and the amount of RF energy to be stored. Likewise, diodes D1 and D2 can be selected based on the frequency band of interest and the amount of RF energy to be stored. Diodes D1 and D2 can be implemented, for example, with hot carrier RF detector diodes (e.g., Avagotech, P.N. HSCH5340), or other suitable diodes (e.g., Schottky, 1N277, or 1N4740 diodes). Capacitor C1 can be implemented, for example, with a 100 pF antenna coupling capacitor, and capacitor C2 can be implemented, for example, with 1 uF energy storage capacitor. Other such rectification/multiplication schemes are discussed in turn and/or will be apparent in light of this disclosure.

The hysteretic switch 103 is configured to permit the RFID tag to absorb ambient radiation over a period of time until such time as the capacitor C2 is sufficiently charged (e.g., predetermined threshold), after which the power from the capacitor C2 is coupled to the oscillator 105 which then emits a signal burst. The charging cycle of C2 is generally longer relative to the transmit cycle of the oscillator 105 (i.e., C2 generally discharges faster than it charges). In the example embodiment shown, the hysteretic switch 103 is implemented with transistors Q1 and Q2 coupled as shown (e.g., Q1: PNP 2N5089 and Q2: NPN 2N5087, in surface mount package, if desired). Other such hysteretic switching schemes will be apparent in light of this disclosure. In any such cases, the hysteretic switch 103 is operative to switch capacitor C2 to oscillator 105 when the voltage across capacitor C2 is above a predetermined level, and to maintain the connection of capacitor C2 to oscillator 105 until such time as the charging on capacitor C2 drops below a predetermined level. In this way, hysteretic switch 103 allows conduction of electrical current when a first "charged" threshold voltage is reached (which triggers operation of oscillator 105), and continues to allow conduction of electrical current until a second lower "recharge" threshold voltage is reached, at which time conduction ceases (and oscillator 105 stops oscillating).

Figure 1B:
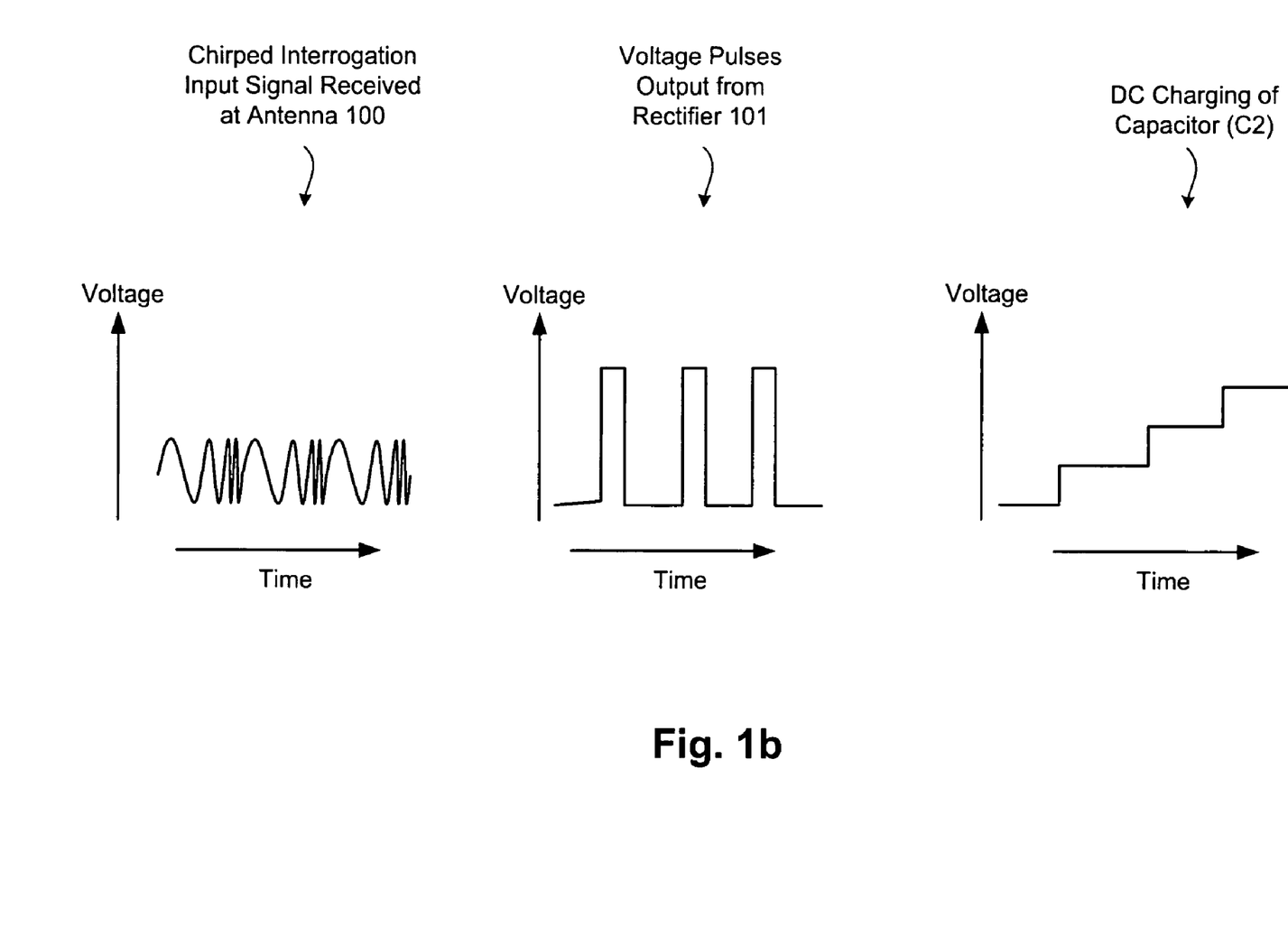
FIG. 1b illustrates a chirped interrogation input signal to the frequency-dispersive antenna of the RFID tag shown in FIG. 1a, and the corresponding signals at the output of the rectification circuit and on the storage capacitor, in accordance with an embodiment of the present invention.

FIG. 1b illustrates an example chirped interrogation input signal that is applied to antenna 100 of the RFID tag shown in FIG. 1a, and the corresponding signals at the output of the rectification circuit 101 and on the storage capacitor C2. After capacitor C2 is sufficiently charged (e.g., based on a pre-established threshold), any number of RFID circuits can be used to respond to the interrogation signal, such as a modulated back-scattering by switched load, or active transmission circuitry. In the specific example embodiment shown in FIG. 1a, the RFID circuit is configured as a stabilized oscillator 105, as will now be discussed. Note, however, that other embodiments may implement the RFID circuit in a different fashion, and the present invention is not intended to be limited to any particular type of RFID circuit. In short, any RFID circuit capable of operatively coupling with a frequency-dispersive antenna/element and rectifier circuit (rectenna), so as to operate as a transponder can be used.

The stabilized oscillator 105 includes a nonlinear amplifying device, which in this example embodiment is implemented with a low power microwave bipolar transistor Q3 (e.g., NEC/CEL, P.N. NE68018). Alternatively, this nonlinear amplifying device may be implemented with a negative resistance diode or other such suitable device. In any such cases, the nonlinear amplifying device (such as Q3) reaches an equilibrium state when it limits its output power such that the loop gain around a resonant feedback path (comprising capacitors C4 and C6 operatively coupled to Q3 as shown) is unity. The frequency of oscillation can vary depending on the given application. In one example embodiment, the frequency of oscillation is in the range of about 800 MHz to 3 GHz. For instance, typical FCC-allowed unlicensed transmitting tag frequency bands are at 915 MHz and 2.45 GHz, although other frequencies can be used. L1 and C3 resonate and set the oscillation frequency, with C4 and C6 providing feedback for nonlinear amplifying device Q3.

In one particular such embodiment, each of capacitors C3, C4, C5, C6, and C7 are on the order of several picofarads (e.g., 3 pF to 5 pF), and inductor L1 is on the order of several nanohenries (e.g., 3 nH to 5 nH). Resistors R1 and R2 provide bias for Q3 (e.g., collector-emitter voltage Vce and collector current Ic). In this example embodiment, R1 is 200 Kohms, and R2 is 1 Kohms, so as to provide Q3 biasing conditions where Vce equals about 0.9 v and Ic equals about 1.0 mA. L1, R1, R2 and C3-7 can be implemented, for example, with common surface mount chip devices in a standard 0603 package (0.06"×0.03") or other suitable packaging. Alternatively, L1 can be a printed wiring board or substrate trace, and R1, R2 and C3-6 can be implemented with thin and/or thick film technology. Likewise, L1 can be implemented with thin and/or thick film technology. Components L1, R1, R2 and C3-7 can be adjusted or otherwise fine tuned if so necessary, using techniques such as laser trim, wire bond jumpers, etc. The components shown in FIG. 1a can be implemented with any components suitable for a given application, and the present invention is not intended to be limited to any particular configuration or set of components.

The stabilized oscillator 105 is stabilized in that it is configured to lock on to the frequency of the interrogator signal provided by the tag reader. As such, the interrogator signal (from the tag reader) and the response signal (from the tag oscillator 105) have the same frequency and are in phase both temporally and spatially. Thus, the RFID tag design provides an output which is coherent with a known controlled input signal (interrogator signal), thereby greatly improving frequency stability of the tag oscillator 105 and making the tag easier to detect than a tag having a non-coherent or otherwise unstabilized oscillator. Additional details regarding embodiments using a stabilized oscillator can be found, for example, in the previously incorporated U.S. Pat. No. 7,970,357.

Other example oscillator-based RFID circuits that can be used are discussed in the previously incorporated U.S. application Ser. No. 11/578,275. As previously noted, however, any RFID circuit capable of receiving and responding to interrogation signals can be used here. In another example case, the RFID circuit is implemented as a read-only RFID tag that is configured with an on board stored coded waveform (e.g., stores information relevant to given application). When triggered by an interrogation pulse from the rectenna, the RFID circuit is further configured to transmit the waveform/info back to the base station (or other tag reader).

Continuing with the example embodiment shown in FIG. 1a, the rectification circuit 101 is configured as a half-wave voltage doubler. However, and as previously explained, other rectification circuits can be used to provide the desired multiplication and performance attributes. In general, a voltage multiplier is a specialized rectifier circuit for generating a rectified DC output that is essentially an integer multiple of the AC peak input. For instance, applying a 1 VpeakAC input signal to a voltage doubler as shown in FIG. 1a generates a 2 VDC output signal (assuming no impact on output voltage from loading). Other multiplier configurations, such as triplers, quadruplers, etc can also be used, depending on the target application and RFID circuitry employed. For example, a voltage multiplier of cascaded half-wave doublers of arbitrary length is known as a Cockcroft-Walton voltage multiplier, which includes a diode-capacitor configuration. Likewise, a Dickson voltage multiplier (sometimes called a charge pump) can be used, which operates in a similar fashion to a Cockcroft-Walton voltage multiplier, but the nodes of the diode chain are coupled to the inputs by parallel capacitors (as opposed to serial capacitors). Thus, the type and configuration of rectification circuit 101 can be selected based on particulars associated with the target application. As will be appreciated in light of this disclosure, numerous other rectification circuits can be used here (e.g., two-phase voltage doubler, multi-phase voltage doublers, Makowski charge pump, etc). Such example circuits can be configured as half-wave or full-wave rectifier configurations, and may employ any number of stages (stage-1, stage-2, stage-3 . . . , stage-N), and typically operate by transferring charge from one capacitor to another using diode switching capability.

In any such cases, diodes included in a rectification circuit 101 become exponentially inefficient at low input voltage levels. Having a constant envelope signal ensures a relatively low voltage level over the duration of the signal. As such, and in accordance with an embodiment of the present invention, it is advantageous to combine pulses from adjacent time intervals into a single pulse having a higher voltage. Because tag readers are typically limited to a maximum equivalent isotropically radiated power (EIRP), the techniques described herein can be used to effectively increase the charging or detection range of RFID tags without violating established regulations (such as those set by the FCC). The techniques described herein can also be used, for example, to increase the detection range of military tag readers in cases where maximum radiated power levels are desirable.

Figure 1C:
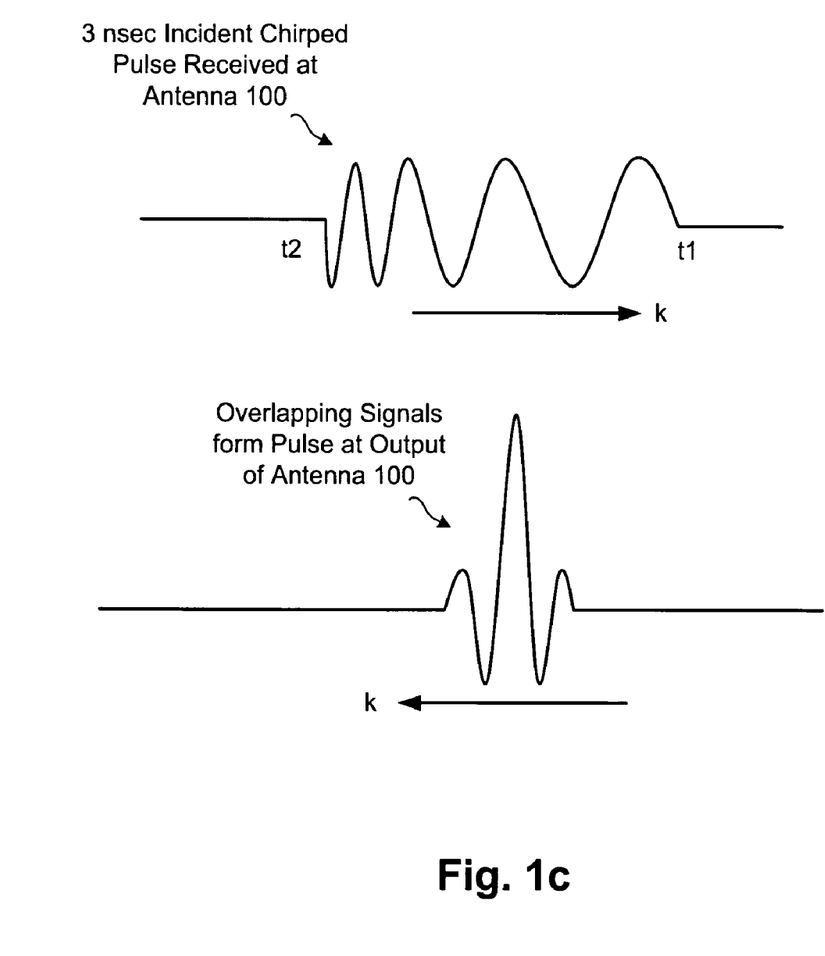
FIG. 1c illustrates a chirped interrogation input signal to the frequency-dispersive antenna of the RFID tag shown in FIG. 1a, and the corresponding signal at the output of the frequency-dispersive antenna, in accordance with an embodiment of the present invention.

This is because a frequency-dispersive antenna varies time delay with frequency, and a frequency-varying waveform uses delay time to group a set of different pulses into a single combined pulse at the antenna output, thereby exploiting exponential increase in diode efficiency with increased input voltage. This concept is illustrated in FIG. 1c, which shows a chirped interrogation input signal received at the frequency-dispersive antenna 100, and the corresponding signal at the output of the frequency-dispersive antenna 100, in accordance with an embodiment of the present invention. Note that k is the rate of frequency increase or chirp rate, which can be set according to particulars of a given application. As can be seen, the signal at the antenna 100 output includes a number of overlapping signals that form a pulse that is input to the rectifier 103. In contrast, conventional RFID tag designs use non-dispersive antennas where the signal delay through the antenna is generally independent of frequency.

As can be further seen, the example RFID tag configuration shown in FIG. 1a is passive in that it has no battery or internal power source. Instead, the tag scavenges RF power received from the tag reader interrogation signal. In such cases, it is particularly advantageous to have a greater range for charging the passive RFID tags. A chirped transmit pulse from (e.g., from handheld transponder/interrogator) is rectified and voltage multiplied (e.g., using cascaded diode sections of the rectification circuit) at the RFID tag to charge up the storage capacitor, which effectively functions as a battery for the passive tag. Active batteries cost more and have a finite shelf life, especially when the tag must periodically listen for an interrogation signal over many years. That said, the techniques described herein can be used with active RFID tag designs having an on-board power source as well, if so desired.

Dispersive Antenna for Chirped Charging of Rectenna

As previously explained, passive RFID tags with rectennas are range limited by the allowed charging power (which is limited, for example, by regulations of the Federal Communications Commission in the U.S.A.). Thus, it is desirable to get more power to the RFID tag rectenna to charge it up, and hence increase the range of the tag. Using a dispersive antenna as described herein effectively increases power at the voltage rectifier. The threshold power received by the dispersive antenna is the instantaneous power, not the average power. This instantaneous power is enhanced by the dispersive antenna. Specifically, the instantaneous power is the average power of the chirped input waveform multiplied by the time-bandwidth product of the dispersive antenna. Effectively, the CW received power becomes pulsed, with the same average power. As can be seen by example of Table 1, the same instantaneous pulsed power can be achieved with 4 times less average power, and the charge range (also referred to as detection range or turn-on range) is doubled when a time-bandwidth product of 4 is provided. In short, an increased turn-on range is possible when using a compressed pulse to generate a large instantaneous voltage in the diodes of the rectenna.

The turn on range of the RFID tag configured in accordance with an embodiment of the present invention can be computed as:

$$R = \left(\frac{P_{trans}}{P_{rec}} G_{trans} G_{rec}\right)^{1/2} \left(\frac{\lambda}{4\pi}\right),$$

where R is the turn-on range, $P_{trans}$ is the power transmitted (in watts), $P_{rec}$ is the threshold instantaneous power received (in watts), $G_{trans}$ is the transmit gain of the antenna, $G_{rec}$ is the receive gain of the antenna, and $\lambda$ is the wavelength. A general antenna formula is that antenna gain is equal to efficiency times directivity. As is known, directivity has to do with the sharpness of the radiation pattern. Thus, and with further reference to Table 1, $G_{trans}$ is equal to the transmit efficiency times the transmit directivity, and $G_{rec}$ is equal the receive tag efficiency times the receive directivity.

A suitable frequency-dispersive antenna can be implemented in a number of ways including, for example, a spiral antenna, or a surface acoustic wave (SAW) load integrated into a spiral or other antenna (e.g., dipole), or as an embedded RF dispersive line integrated into an antenna (e.g., high-dielectric offset substrate). A spiral antenna can be implemented, for example, as a simple spiral (e.g., Archimedean spiral or a log spiral), or as a spiral with one or more resonant parasitic elements to enhance the dispersion, or as a spiral with an offset dielectric substrate to enhance dispersion. The spiral designs may be implemented, for instance, with square, rectangular, or circular configurations. A SAW-based configuration can be implemented, for example, as done in commercial cell phone designs, which typically employ low-cost, low-loss SAW filters, which can be integrated into suitable antenna designs. Each of these example dispersive antenna designs will be discussed in detail.

As previously explained, the time-bandwidth product of the dispersive antenna is approximately equal to the power improvement. For instance, if a 100 MHz bandwidth is given at 1 GHz, and a factor 2 improvement in the power is desired, then the delay time necessary is approximately 20 ns. A dispersive antenna is capable of enhancing the charge capability of a rectenna RFID tag, where 1 Vdc rectification is needed, for example. The diodes of the rectification circuit are in the square law regime at far distances, and even a factor 2 increase in the incident charging power will have a factor 4 enhancement in the rectification.

Spiral Antenna

Figure 2A:
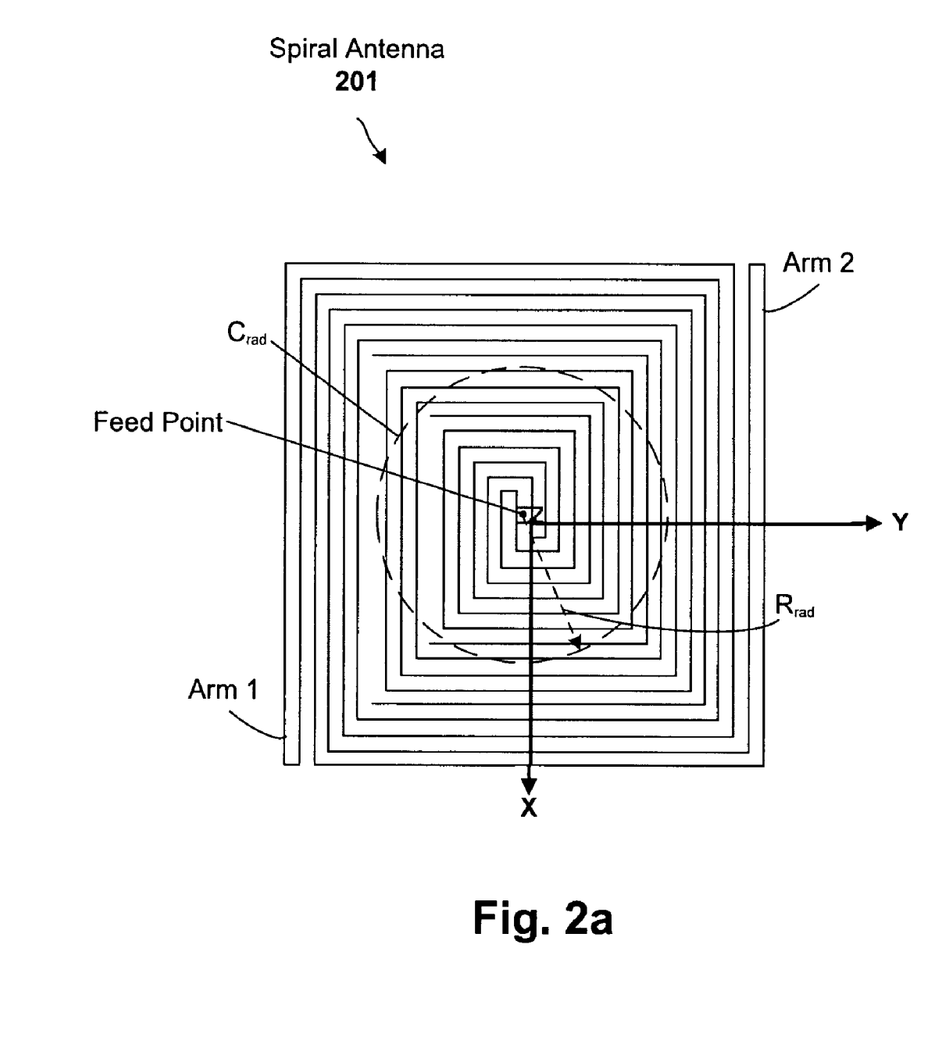
FIGS. 2a-2c each illustrates a spiral antenna for use in an RFID tag configured in accordance with an embodiment of the present invention.
Figure 2B:
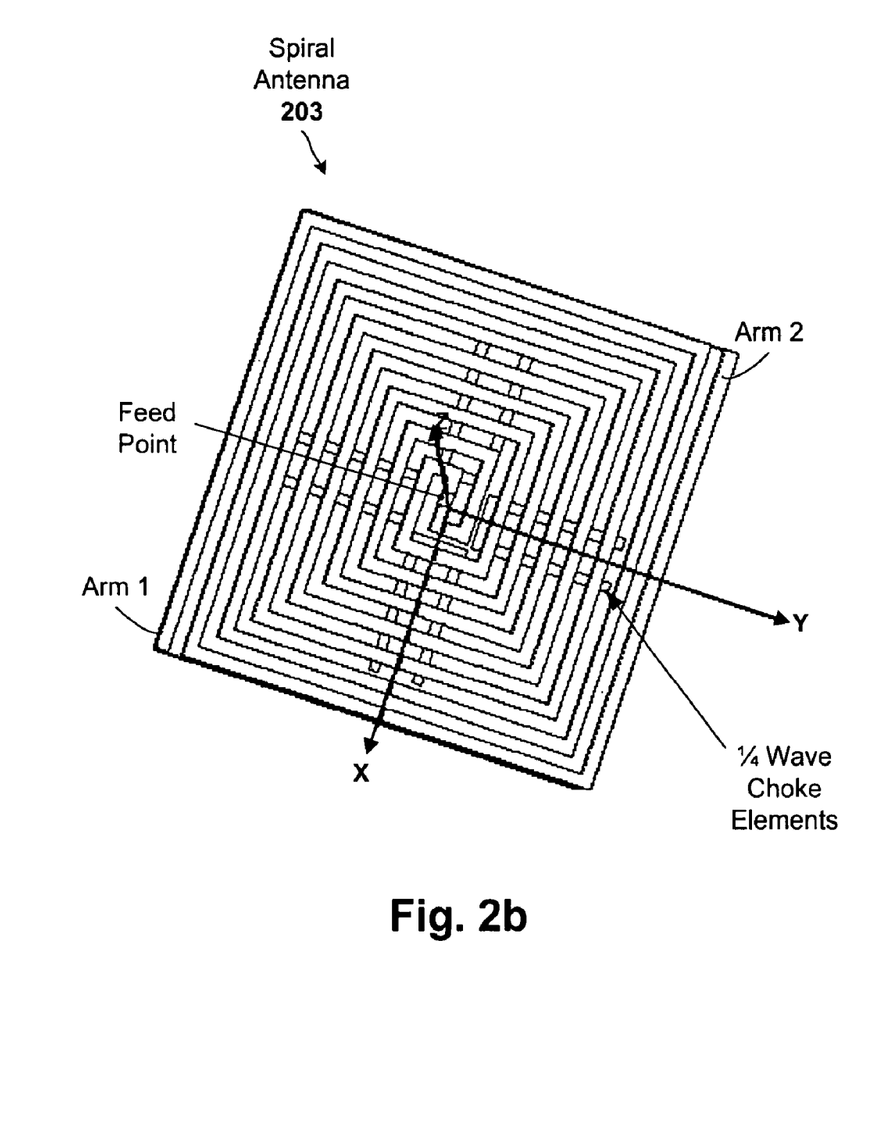
Figure 2C:
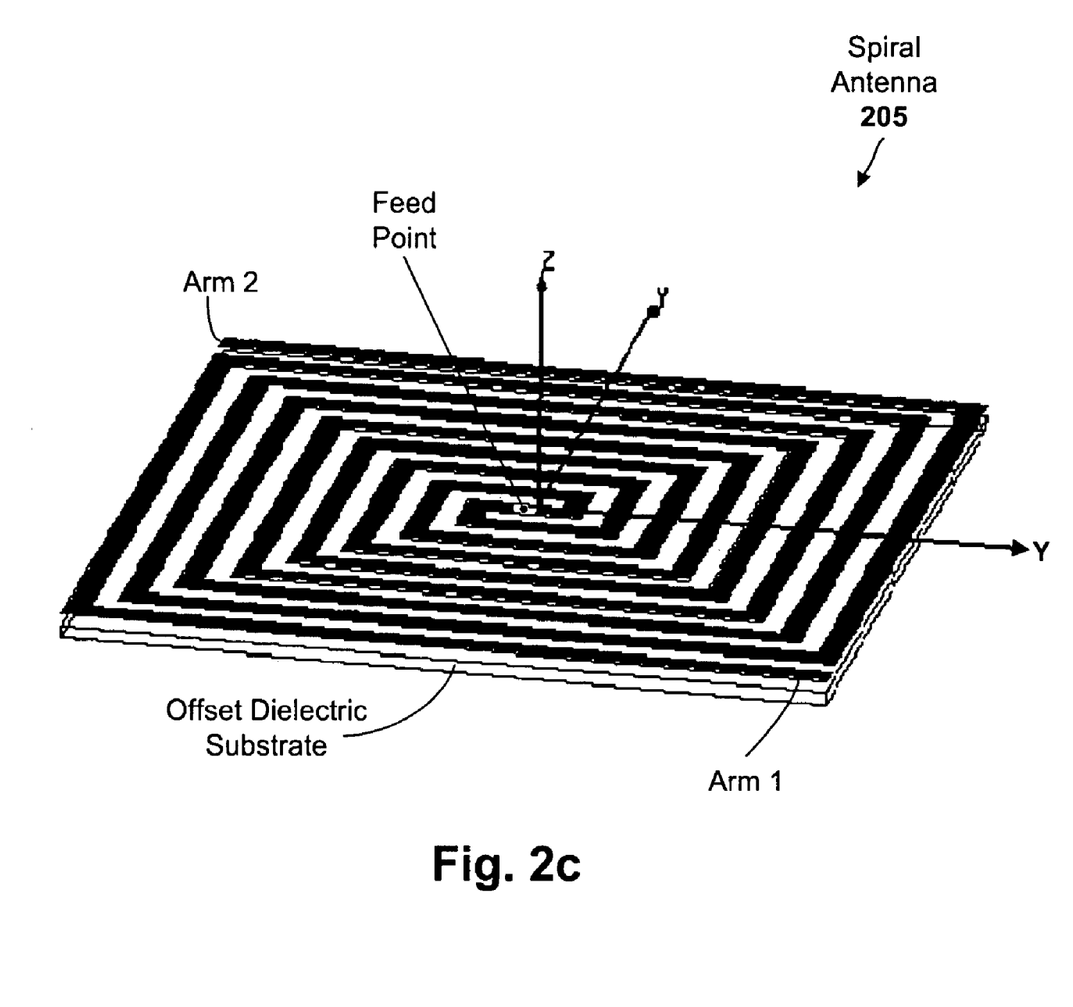

FIGS. 2a-2c each illustrates a spiral antenna for use in an RFID tag configured in accordance with an embodiment of the present invention. A spiral antenna is a naturally dispersive antenna. Recall that a frequency-dispersive antenna varies time delay with frequency, and a frequency-varying interrogation waveform (also generally referred to as a chirped waveform) uses delay time to effectively group a set of different pulses into a single combined pulse at the antenna output, which can then be used to exploit exponential increase

TABLE 1

| Power Transmit (W) | Transmit Directivity | Threshold Instantaneous Power Receive (W) | Time-Bandwidth Product | Receive Directivity | Wavelength (m) | Freq (GHz) | Transmit Efficiency | Receive Tag Efficiency | Charge Range (m) |
| --- | --- | --- | --- | --- | --- | --- | --- | --- | --- |
| 1.00E+00 | 1 | 1.00E−05 | 1 | 2 | 0.15 | 2 | 1 | 1 | 5.324 |
| 1.00E+00 | 1 | 1.00E−05 | 4 | 2 | 0.15 | 2 | 1 | 1 | 10.648 | in diode efficiency with higher input voltage. This grouping concept is demonstrated in FIG. 1c. Further recall that the instantaneous power is the average power of the chirped input waveform multiplied by the time-bandwidth product of the dispersive antenna.

FIG. 2a illustrates an example Archimedean spiral antenna 201 for use in an RFID tag, in accordance with one embodiment. Note that Archimedean spirals are not required, and other spiral designs (e.g., log-periodic spiral designs) can also be used. Further note, however, that the group delay may vary with different designs. For instance, the group delay is quadratic with frequency for an Archimedean spiral, and is linear with frequency for a flared spiral (log-periodic). In general, a tighter number of turns in the spiral antenna design (in same aperture) provides larger delays and therefore more dispersion. However after a certain density of turns, inefficiency may occur depending on operating parameters.

As can be seen in FIG. 2a, the Archimedean spiral antenna 201 includes two arms (Arm 1 and Arm 2), which are operatively coupled at a centrally located feed point. The feed point may be implemented, for example, with a shorted or open center and may be reactively loaded (to provide extra discrimination) if so desired. In one specific such example, assume that the spiral antenna 201 is a 4-inch square spiral (from outer edge to outer edge) that exhibits a 3 nSec group delay per arm from about a chirped input signal sweeping 1 GHz to 2 GHz, using a single feed spiral, where each arm (e.g., wire or printed circuit run) has 8 turns. In such a case, the time-bandwidth product is equal to 6 (i.e., two arms each having a 3 nSec delay for a total of a 6 nSec group delay over a 1 GHz bandwidth).

Thus, to summarize, the time-bandwidth product can be computed as:

$$\Delta t \Delta f = \left(\frac{V_{pulse}}{V_{average}}\right)^2 \sim 3,$$

where $\Delta t = 3.0$ nsec and $\Delta f = 1.0$ GHz. As will be appreciated in light of this disclosure, $\Delta t$ is the differential time delay from low end of swept input frequency band (e.g., t1 of FIG. 1c) to the high end of swept input frequency band (e.g., t2 of FIG. 1c). In such an example case, $$\frac{V_{pulse}}{V_{average}} = 1.7.$$

Hence, there is about 70% more instantaneous RF voltage at the rectifier circuit of the RFID tag (as compared to average voltage).

Also, the time delay ($\Delta t$) or pulse compression for a given Archimedean spiral antenna can be computed, in accordance with an embodiment, by determining the ratio of the transmission line length to radius where dominant radiation occurs (radiation radius, $R_{rad}$). This ratio is number of turns times the average circumference ($C_{ave}$) per turn. First, compute the radius at the radiation point:

$$R_{rad} = \frac{\lambda}{2\pi},$$

from which circumference radiation, $C_{rad}$ can be computed. Each of $R_{rad}$ and $C_{rad}$ are graphically shown in FIG. 2a. Then, compute the average radius to get to radiation point:

$$R_{ave} \sim \frac{2}{3}R_{rad} = \frac{\lambda}{3\pi}.$$

Then, compute the average circumference of the spiral transmission line to get to radiation radius:

$$C_{ave} \sim 2\pi R_{ave} \sim \frac{2}{3}\lambda,$$

where $C_{ave}$ is the circumference of the transmission line winding out from the feed point. Then, compute the average number of turns to get to radiation radius:

$$N_{ave} = nR_{ave} = \frac{n\lambda}{3\pi}.$$

The total path length to get to radiation radius can then be computed as follows:

$$l = N_{ave}C_{ave} = \frac{n\lambda}{3\pi}\frac{2}{3}\lambda = \frac{n}{\pi}\frac{2}{9}\lambda^2.$$

Hence, for an Archimedean spiral antenna, $$\text{delay} \sim \lambda^2 \sim \frac{1}{f^2}.$$

As will be apparent in light of this disclosure, a flared spiral antenna (sometimes referred to as a log spiral antenna) can be used to get 1/f dependence, but less delay).

Once the RFID tag is charged and re-transmits a signal, the returned power falls off as range to the second power due to the one-way path loss (i.e., Arm 1 or Arm 2), but the range limit is determined by the charging ability of the tag, which follows a range to the fourth power law (one-way path loss times power square conversion efficiency). In some example embodiments, a receiver bandwidth of about 10 kHz can be assumed because the frequency of the local oscillator may not be precisely known. In addition, it can be assumed that the tag can discharge its storage capacitor (e.g., C2 of rectifier circuit 101) relatively quickly using a low duty cycle, and achieve about 10 dBm transmit power, for example.

FIG. 2b illustrates an example Archimedean spiral antenna 203 for use in an RFID tag, in accordance with another embodiment. In particular, this example antenna 203 is similar to the one shown in FIG. 2a, but further includes a number of one-quarter wave choke elements. Other such resonant parasitic elements (e.g., one-half wave choke elements, etc) and layout configurations can be used as well. FIG. 2c illustrates an example Archimedean spiral antenna 205 for use in an RFID tag, in accordance with another embodiment. In particular, this example antenna 205 is similar to the one shown in FIG. 2a, but is formed on an offset dielectric substrate. This antenna configuration is also an example of a meanderline antenna configuration (note, however, that meanderline antennas are not always spiral in nature). In general, the dispersion can be enhanced by adding resonant parasitic elements or adding a half wavelength thick substrate weakly or otherwise operatively coupled to the spiral antenna. In the latter case, if the substrate is a half wavelength thick (e.g., using high-dielectric substrate), then a non-TEM mode propagates and there is dispersion (HE11 mode). Given high-frequency tags (e.g., 10 GHz and higher), using dielectric constants of 100 or higher, the thickness of the substrate can generally be thinner (e.g., about 0.060 inches, or less).

Figure 3:
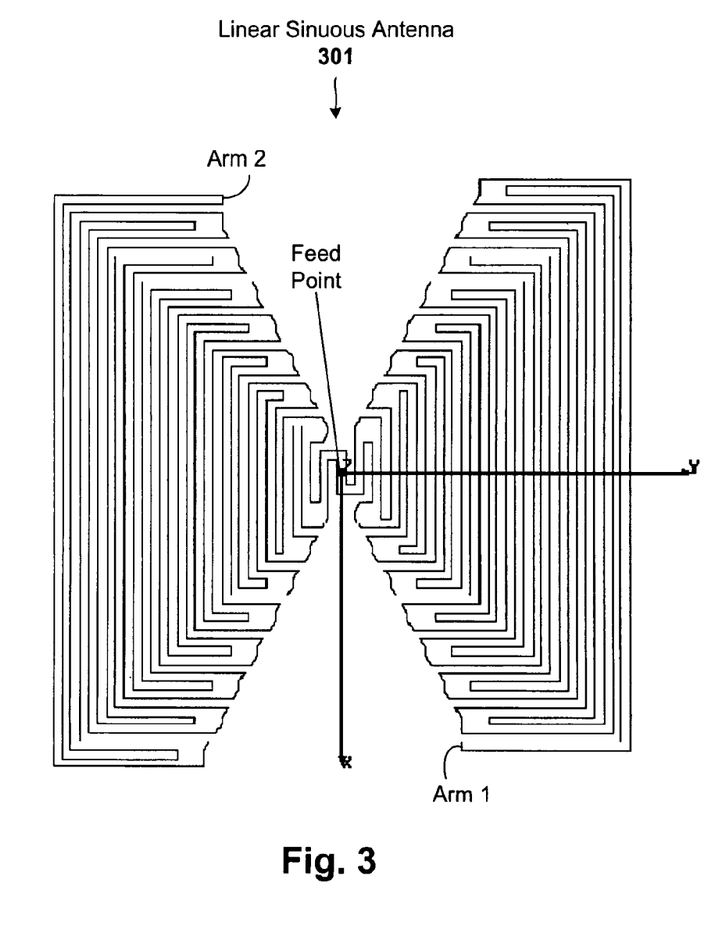
FIG. 3 illustrates a linear sinuous antenna for use in an RFID tag configured in accordance with an embodiment of the present invention.

In other embodiments, the circular polarization (CP) spirals of FIGS. 2a-2c can be implemented, for example, as a linear-polarization sinuous antenna having the same dispersion properties. FIG. 3 illustrates an example sinuous antenna 301, in accordance with one such embodiment. As can be seen, the antenna 301 includes Arm 1 and Arm 2 operatively coupled at a feed point, in a similar fashion to the antennas shown in FIGS. 2a-2c. The gain of antenna 301 is directed along the orthogonal axis of the antenna (like a patch antenna). Linear dispersion can be accomplished using a log-periodic type sinuous antenna.

The example antennas shown in FIGS. 2a-2c and 3 are each shown as a printed square antenna configuration. Other antenna configurations (e.g., wire and/or circular configurations) will be apparent in light of this disclosure, and the present invention is not intended to be limited to any particular such configurations.

Figure 4:
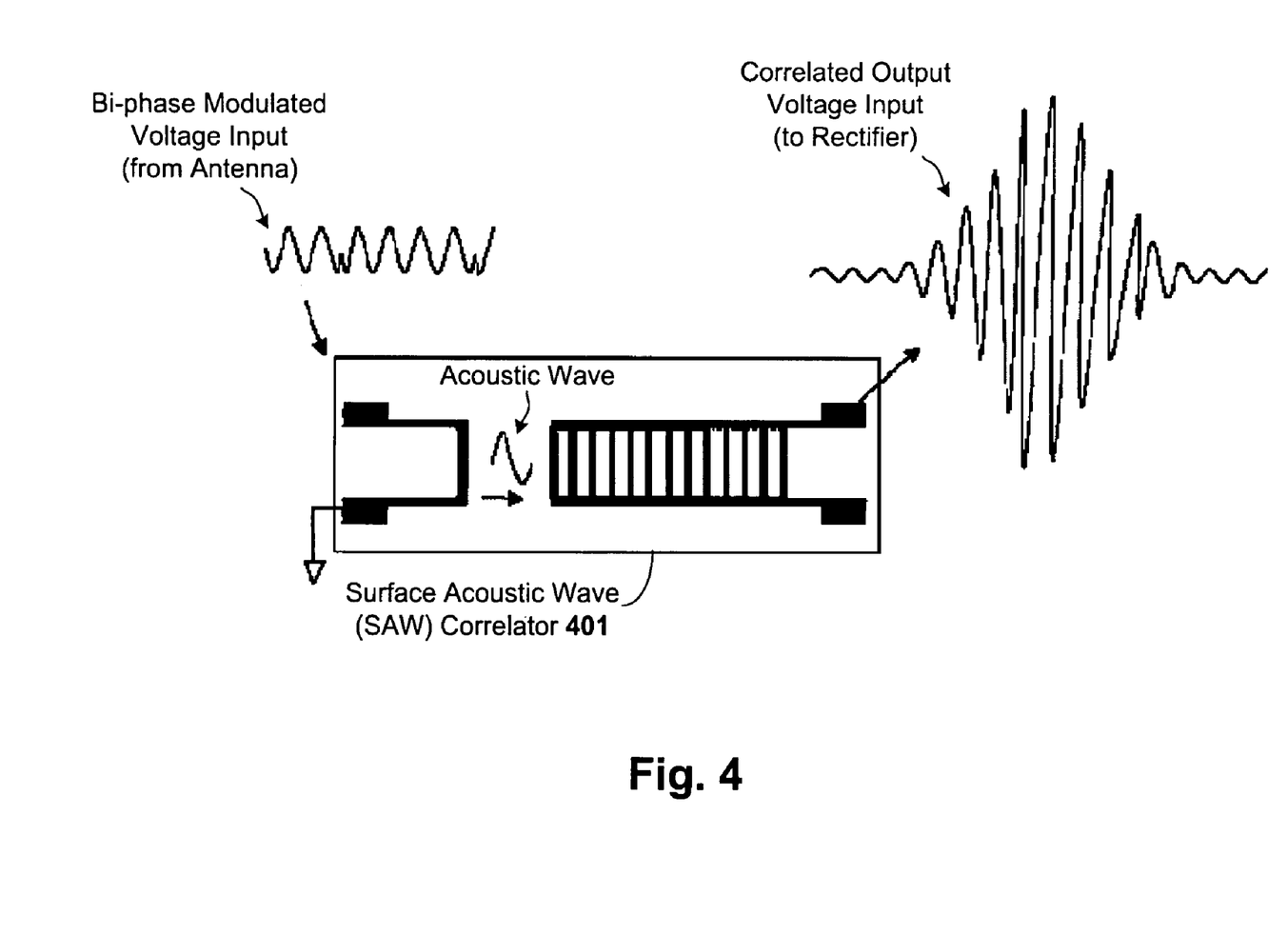
FIG. 4 illustrates a surface acoustic wave (SAW) correlator for use in an RFID tag configured in accordance with an embodiment of the present invention.

FIG. 4 illustrates a surface acoustic wave (SAW) correlator 401 for use in an RFID tag configured in accordance with an embodiment of the present invention. As can be seen, the SAW correlator 401 can be integrated or otherwise operatively coupled with an antenna. The antenna may be, for example, a spiral antenna or a dipole antenna. In any such cases, the antenna provides a multi-phase (e.g., bi-phase) modulated voltage input signal to the SAW correlator 401, which then outputs a correlated output voltage as shown. As can further be seen, the correlated output voltage of SAW correlator 401 resembles a pulse to the rectification circuit. The SAW correlator 401 can be implemented with conventional technology, with its various parameters (e.g., frequency range of operation) set in accordance with the given application.

Figure 5:
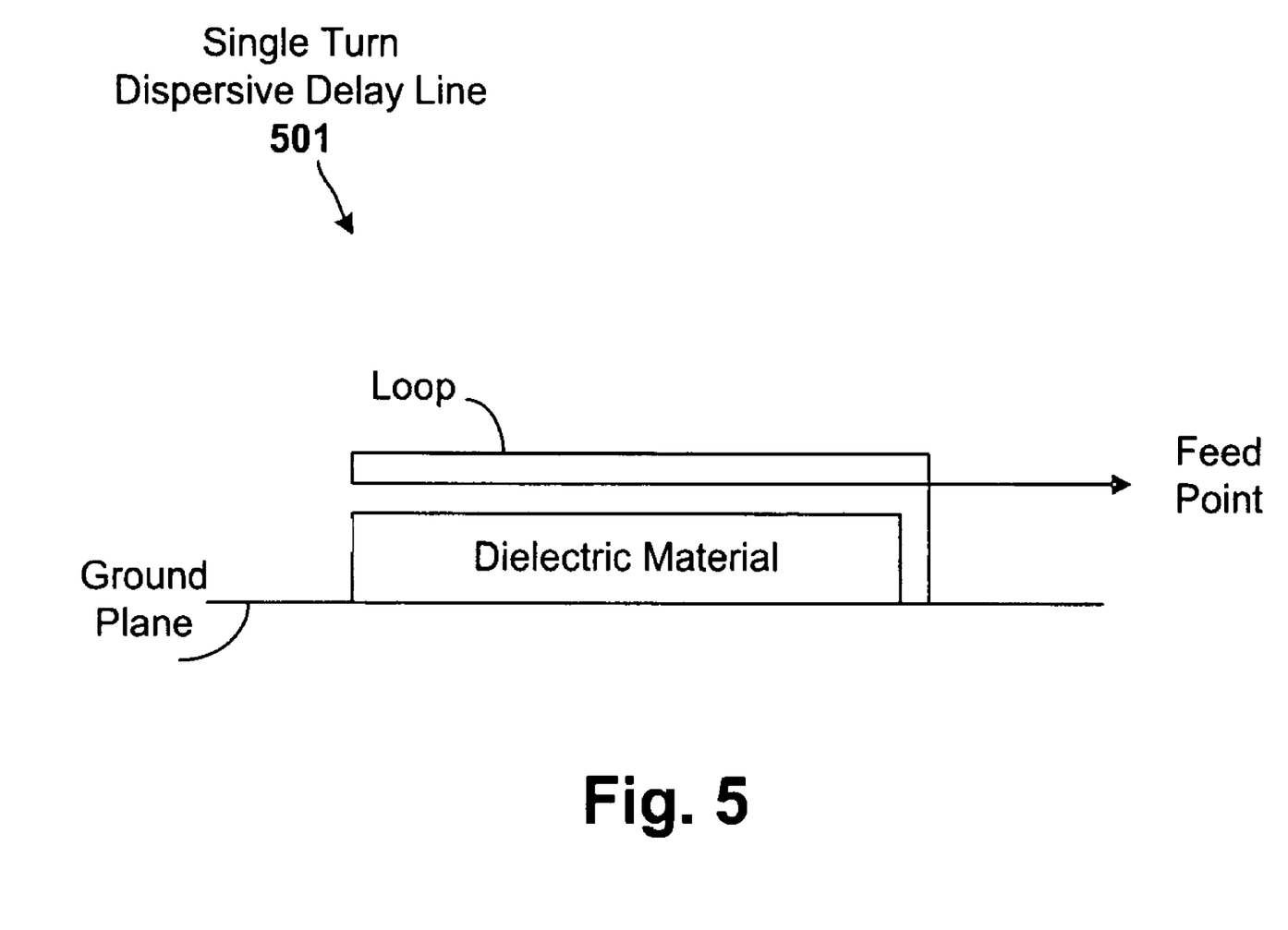
FIG. 5 illustrates a single turn dispersive delay line for use in an RFID tag configured in accordance with an embodiment of the present invention.

FIG. 5 illustrates a single turn dispersive delay line 501 for use in an RFID tag configured in accordance with an embodiment of the present invention. As can be seen, the dispersive delay line 501 includes a single loop that is operatively coupled to a feed point at one end and a ground plane at the other end. A dielectric material is disposed between the loop and the ground plane as typically done. The dispersive delay line 501 is shown with one turn (loop) but may include any number of turns, and can be implemented, for example, with any reactively loaded small antenna that is dispersive, such as a meanderline antenna. In some embodiments, the dispersive delay line 501 can be used in conjunction with and built next to a non-dispersive antenna (e.g., dipole antenna), although it may be desirable to combine the antenna and the dispersion element (in this case, delay line 501) into one.

In one specific example, the dispersive delay line 501 is implemented as a meanderline antenna that has a center frequency of 3.4 MHz and a usable bandwidth of about 350 MHz. The differential delay is about 3 nSec per loop. The height of the example antenna is about 0.2 inches, the width is about 0.05 inch, and the length is about 1 inch. The dielectric material in this example is titanium dioxide, although other suitable dielectric materials will be apparent. An approximate measurement of the gain at 3.4 GHz is about 0 dbi. Numerous other antenna materials and configurations can be used here, as will be apparent in light of this disclosure; the present invention is not intended to be limited to this specific example. If a 10 turn (loop) antenna 501 is used, then the differential delay will be about 30 nSec. The time-bandwidth product of that particular configuration is about 10.5 with a voltage gain of about 3.24. The volume of the example antenna assembly is about 0.1 cubic inches, which can be reduced by increasing the dielectric constant (e.g., titanium dioxide has a dielectric constant of about 100). For example, utilizing strontium titanate with a dielectric constant of 250 should result in a reduction of volume of 4. Using a material with a dielectric constant of 500 should result in a reduction of 11 in the volume, which will result in a reduction of gain of 10.4 db, or a gain of −10.4 dbi.

In some embodiments, a meta-material layer can be used just above the dielectric material to enhance the dispersion and to reduce the size of the antenna. For example, consider a bulk or layered material, such as a sheet or block or meta-materials that include a number of switchable reflective elements. Some of the elements within the material can be coupled to one another via RF-actuated microelectromechanical systems (MEMS) switches, and/or some elements can be coupled to ground or another potential via RF-actuated MEMS switches. Numerous element switching schemes can be used to effect various known antenna and reflector configurations, as will be apparent in light of this disclosure. In any such configurations, various characteristics of the meta-material (e.g., dielectric, reflective, bandgap, or polarization properties) can be altered by applying an RF control signal (or RF control signals) to actuate one or more of the RF-actuated MEMS switches within the material. Additional details describing example meta-materials are provided, for instance, in U.S. Pat. No. 7,228,156, titled "RF-Actuated MEMS Switching Element" which is herein incorporated by reference in its entirety. The combination of a higher dielectric constant and the use of meta-material may be used to provide a relatively small, conformal antenna.

As will be appreciated in light of this disclosure, the context of a given application (e.g., commercial, military, medical, etc) may determine certain operating parameters of a corresponding embodiment of the present invention. For instance, a commercial RFID tag may not be permitted to chirp over enormous bandwidths, particularly when RFID bands are regulated (e.g., such as those bands regulated by the FCC). In general, higher frequencies allow for smaller antennas and smaller bandwidths. In one example commercial application, a 5.2-5.8 GHz band would be appropriate for commercial applications, wherein a 350 MHz of bandwidth is acceptable. In the commercial context, however, for frequency ranges below this range it might be difficult to keep size and bandwidth down, except where ultra wide band (UWB) transmissions are allowed. In a military context, such constraints would likely not apply. Similarly, such constraints may not apply, for example, in indoor applications or in certain medical applications.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A transponder, comprising:
   a rectifier;
   a radio-frequency identification (RFID) circuit for receiving and responding to interrogation signals; and
   a frequency dispersion element for receiving a multi-phase input signal and creating a pulse therefrom for input to the rectifier, wherein signal delay through the frequency dispersion element is dependent on frequency.

2. The transponder of claim 1 further comprising:
   a hysteretic switch coupled between the rectifier and the RFID circuit.

3. The transponder of claim 1 wherein the frequency dispersion element comprises a spiral antenna.

4. The transponder of claim 3 wherein the spiral antenna comprises an Archimedean spiral.

5. The transponder of claim 3 wherein the spiral antenna comprises a log spiral.

6. The transponder of claim 1 wherein the frequency dispersion element comprises a spiral antenna with one or more resonant parasitic elements.

7. The transponder of claim 1 wherein the frequency dispersion element comprises a spiral antenna with an offset dielectric substrate to enhance dispersion.

8. The transponder of claim 1 wherein the frequency dispersion element comprises a surface acoustic wave (SAW) correlator.

9. The transponder of claim 8 wherein the SAW correlator is operatively coupled to an antenna.

10. The transponder of claim 8 wherein the SAW correlator is integrated into an antenna.

11. The transponder of claim 1 wherein the frequency dispersion element comprises a dispersive delay line.

12. The transponder of claim 11 wherein the dispersive delay line is a meanderline antenna.

13. The transponder of claim 11 wherein the dispersive delay line is operatively coupled to an antenna.

14. The transponder of claim 11 wherein the dispersive delay line is integrated into an antenna.

15. The transponder of claim 1 wherein the rectifier operates to convert RF energy of the pulse to DC voltage, multiply that DC voltage, and store the resulting voltage.

16. The transponder of claim 1 wherein the RFID circuit includes an oscillator.

17. A transponder, comprising:
    a rectifier;
    a radio-frequency identification (RFID) circuit for receiving and responding to interrogation signals;
    a hysteretic switch coupled between the rectifier and the RFID circuit; and
    a frequency dispersion element for receiving a multi-phase input signal and creating a pulse therefrom for input to the rectifier, wherein signal delay through the frequency dispersion element is dependent on frequency, said pulse formed from multiple overlapping signals of the multi-phase input signal;
    wherein the rectifier operates to convert RF energy of the pulse to DC voltage, multiply that DC voltage, and store the resulting voltage.

18. The transponder of claim 17 wherein the frequency dispersion element comprises at least one of an antenna, a surface acoustic wave (SAW) correlator, and a dispersive delay line.

19. A transponder, comprising:
    a rectifier;
    a radio-frequency identification (RFID) circuit for receiving and responding to interrogation signals;
    a hysteretic switch coupled between the rectifier and the RFID circuit; and
    a frequency dispersion element for receiving a multi-phase input signal and creating a pulse therefrom for input to the rectifier, wherein signal delay through the frequency dispersion element is dependent on frequency, said pulse formed from multiple overlapping signals of the multi-phase input signal, and wherein the frequency dispersion element comprises at least one of an antenna, a surface acoustic wave (SAW) correlator, and a dispersive delay line.

20. The transponder of claim 19 wherein the frequency dispersion element comprises one of a spiral antenna, a log spiral, a spiral antenna with one or more resonant parasitic elements, a spiral antenna with an offset dielectric substrate to enhance dispersion, and a meanderline antenna.

* * * * *